May 20, 1924.

R. G. KRATZ

PASTRY CONE MACHINE

Filed May 29, 1917 3 Sheets-Sheet 1

1,495,082

Witness:
A. W. Jamieson

Roy G. Kratz, Inventor.
By David O. Barnell
Attorney.

May 20, 1924.
R. G. KRATZ
PASTRY CONE MACHINE
Filed May 29, 1917   3 Sheets-Sheet 3
1,495,082
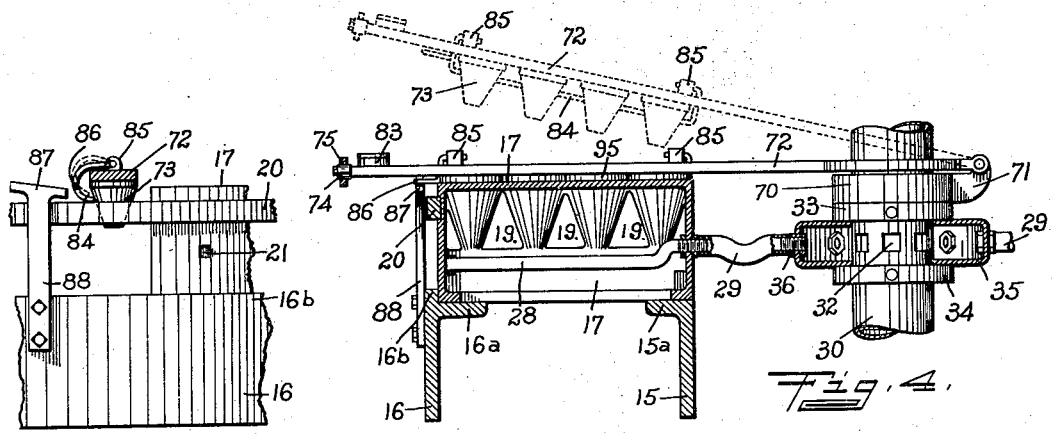
Fig. 3.  Fig. 4.
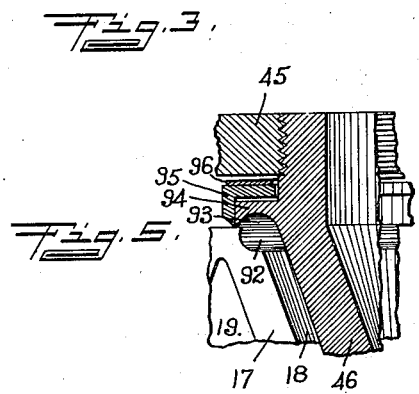 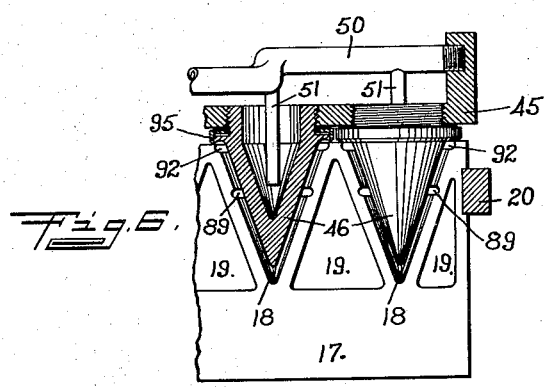
Fig. 5.  Fig. 6.
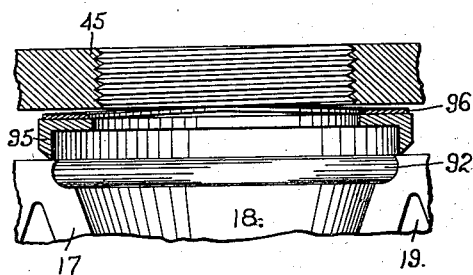 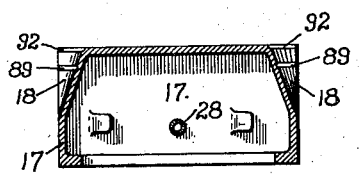
Fig. 7.  Fig. 8.
Roy G. Kratz, Inventor.
Witness:
A. W. Jamieson
By David O. Barnell
Attorney.

Patented May 20, 1924.

1,495,082

UNITED STATES PATENT OFFICE.

ROY G. KRATZ, OF OMAHA, NEBRASKA, ASSIGNOR, BY MESNE ASSIGNMENTS, TO THE McLAREN PRODUCTS CO., A CORPORATION OF OHIO.

PASTRY-CONE MACHINE.

Application filed May 29, 1917. Serial No. 171,753.

*To all whom it may concern:*

Be it known that I, ROY G. KRATZ, a citizen of the United States, and a resident of Omaha, in the county of Douglas and State of Nebraska, have invented certain new and useful Improvements in Pastry-Cone Machines, of which the following is a specification.

My invention relates to machines for manufacturing pastry cups or holders, particularly those of the type commonly known as "ice cream cones." It is the object of my invention to provide for the above purpose a machine having capacity for molding and baking economically large quantities of the cones, the machine being operable continuously and automatically to form the cones and eject the same after baking. My machine is of the continuous or rotary type, and is especially characterized by having a plurality of internally-heated ovens provided in opposite sides thereof with recesses such that the juxtaposition of two of the ovens serves to form between them a series of female mold-parts or mold-cavities, the ovens being arranged in a contacting series upon a circular support and filling the space around said support except at one side where the end-members of the contacting series are separated to open the mold-cavities and facilitate the ejection of the baked product therefrom. In connection with the ovens of the kind described, my invention provides internally-heated, vertically-movable and rotarily mounted male mold-members or cores arranged to cooperate with the female mold-portions to form and bake the hollow cones, means for heating the ovens and cores continuously, means for actuating the ovens around the circular support therefor, means for raising and lowering the cores or male mold-members, means for ejecting the baked product from the molds, means for locking the ovens together while the product is being baked, means for compensating for the expansion of the parts due to the heating thereof, and yieldable trimming devices arranged in connection with the male mold-members and adapted to separate the overflow or excess material from that used in the production of the cones.

Figure 1:
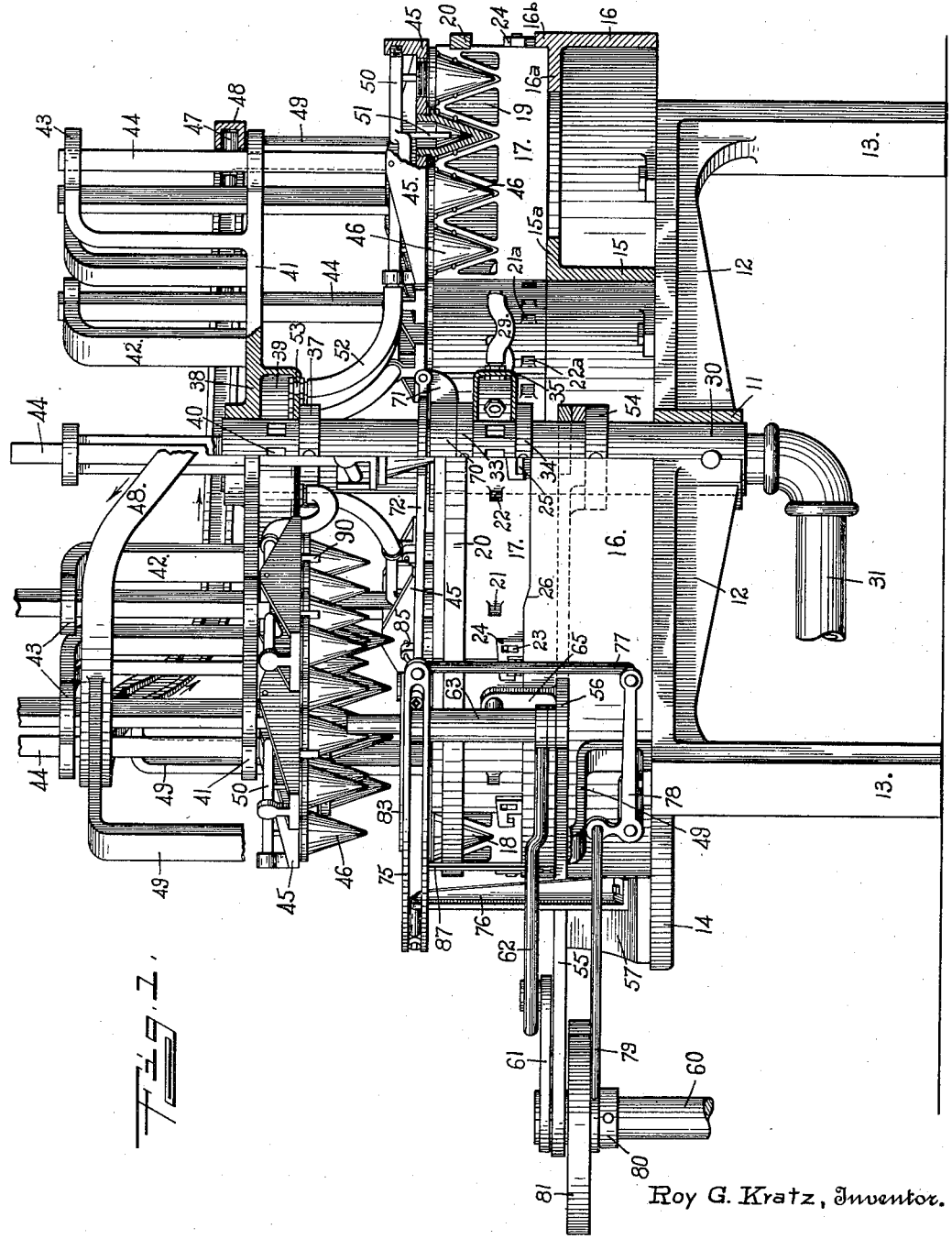
Figure 2:
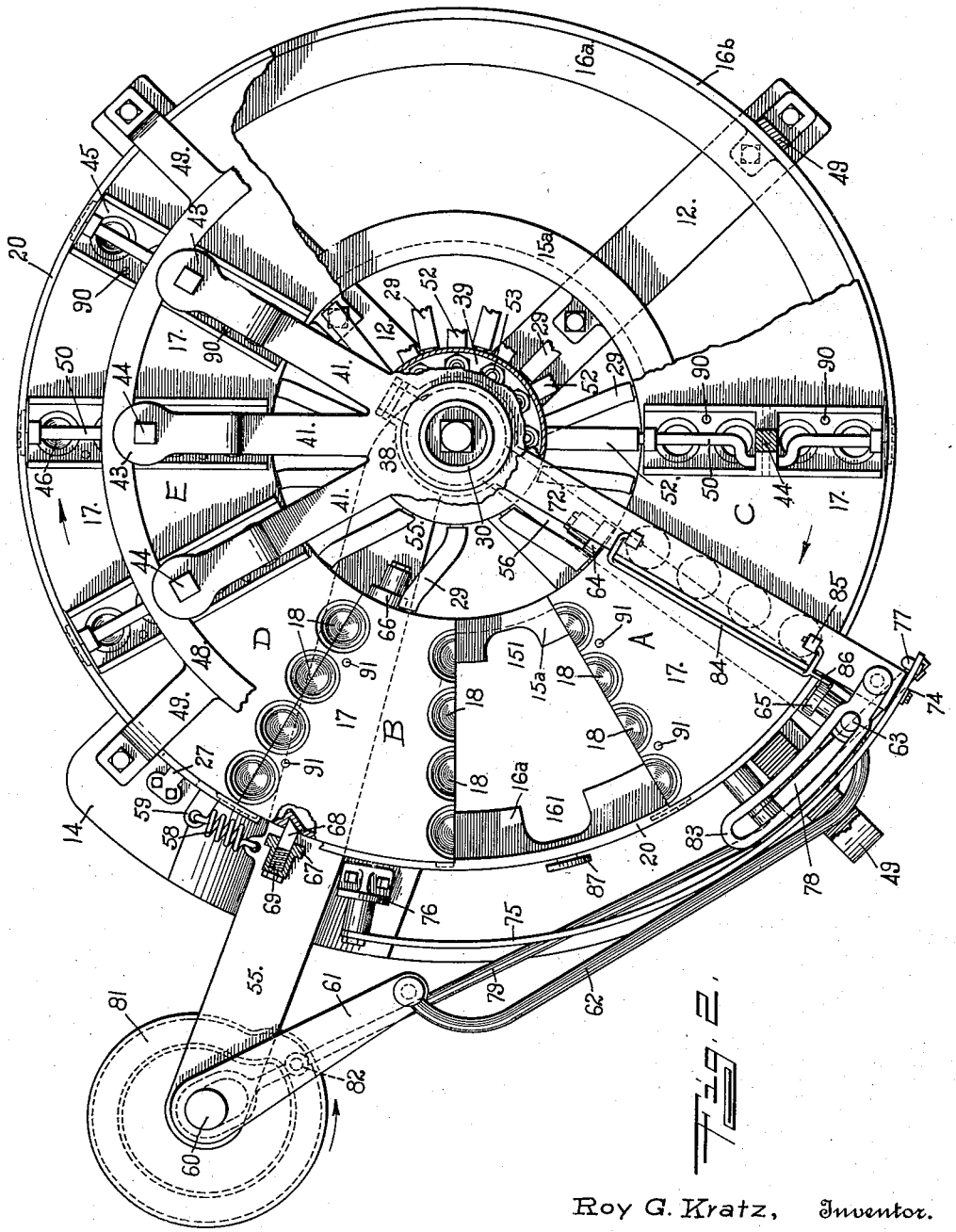

A machine embodying my invention is illustrated in the accompanying drawings, in which Fig. 1 is a partial side elevation and partially a vertical sectional view thereof, Fig. 2 is a plan view with various parts broken away to show the underlying portions, Fig. 3 is a detail front view of the cone-releasing means for the ejector, Fig. 4 is a detail vertical section showing the ejector-bar, Fig. 5 is a detail vertical section through a part of one of the male mold-members showing the yieldable trimmer-ring, Fig. 6 is a detail vertical radial section in a plane between two of the ovens, Fig. 7 is a detail section showing the relation of the trimmer-ring to the female mold-parts, and Fig. 8 is a transverse sectional view of one of the ovens.

In the structure shown I provide a base-frame comprising a central hub 11, radial arms 12 and legs 13 which extend down from the outer ends of the arms 12 and rest on a floor or other support. At the front side of the machine two of the arms 12 are connected by a horizontal arcuate plate 14, the extent of which appears clearly in Fig. 2. On the upper side of the base-frame and arranged concentrically with the hub 11 there are secured the inner and outer base-rings 15 and 16, each of which has at its lower edge inwardly extending lugs which rest upon and are secured to the arms 12 of the base-frame. At the top of the inner ring 15 is an outwardly extending flange 15$^a$, and near the upper edge of the outer base-ring 16 there is an inwardly extending flange 16$^a$, said flanges being horizontally alined with each other and forming directly the support for the movable ovens. The portion of the outer ring 16 which extends above the flange forms a rim 16$^b$ which engages the outer ends of the ovens and retains them in position radially of the circular support formed by the base-rings.

Each of the ovens comprises a hollow metal body 17 of which the transverse sectional form is substantially rectangular, while the horizontal sectional form is a truncated sector of a circle. The outer arcuate ends of the ovens fit against the inner side of the rim 16$^b$ of the base-ring 16, and the number of ovens provided is one less than enough to completely fill the space upon the circular support formed by the flanges 15ª and 16ª of the base-rings. In the radial sides of each of the ovens there is a plurality of semi-conical recesses 18, said recesses on the adjacent sides of each pair of the ovens being coincident radially so that when said sides of the ovens are in contact there are formed between them conical pockets of which the bases or large ends are uppermost, while the points or apexes are directed downwardly. The lower sides of the oven-bodies are partially open, as shown in Fig. 8, and in the radial sides, between the walls of the recesses 18, there are triangular openings 19, as shown in Fig. 6. The outer arcuate ends of the ovens are grooved near the upper edges thereof to receive a retaining-ring 20 which extends circumferentially around all of the ovens, fitting into said grooves and being supported solely by its engagement with the ovens. In said outer ends, each of the ovens is also provided with two notches 21 and 22, of which one side is radial and the other inclined. Similar notches 21ª and 22ª are provided in the inner arcuate ends of the ovens at positions coincident radially with the corresponding notches in the outer ends. Said notches are adapted for engagement with pawls, as hereinafter described, by which the ovens are moved upon the circular support and held in contacting relation to each other.

At their outer ends, immediately above the rim 16ᵇ of the outer base-ring, each of the ovens has a rectangular lug 23 on which is fitted a vertically-slotted plate 24 having at one side a hook-portion which extends beyond the adjacent radial side of the oven so as to overlap the adjoining portion of another oven contacting therewith. Near the sides opposite the hook-plates 24 each oven has a lug 25 adapted for engagement by the hook-plate 24 of the next adjacent oven, so that by means of said lugs and hook-plates the several contacting ovens may be locked together. For raising the hook-plates to detach them from the lugs, the rim 16ᵇ has at one side a raised portion 26, shown in Fig. 1, forming a track adapted to push the plates upwardly during the movement of the ovens past the same. At a position shown in Fig. 2, there is carried on the plate 14 a standard 27 which supports a short track-piece adapted to engage the inclined upper edges of the hook-plates to push them downwardly.

Extending radially through the intermediate portion of each oven there is a gas-burner comprising a tube 28 having suitable perforations along the upper side thereof, the ends of said tubes 28 extending through the inner ends of the ovens and connecting with flexible supply-tubes 29. Fuel-gas together with air in such quantities as may be necessary for proper combustion, is supplied to the tubes 29 by the following means: In the bore of the central hub 11 of the base-frame there is secured the lower end of a tubular center-post 30 which extends up concentrically with the vertical central axis of the machine. To the lower end of said tubular post is connected a pipe 31 which extends to a suitable source of supply for the gas and air to be consumed by the burners. In the sides of the tubular post 30 at a level coincident with the tubes 29 are a number of ports 32, and above and below said ports collars 33 and 34 are secured to the post. An annular shell 35, open at its inner side fits revolubly on the center-post between the collars 33 and 34, and in the outer side of said shell there are secured the ends of pipe-nipples 36 with which the ends of the flexible tubes 29 are connected. The gas and air from the pipe 31 passes up through the tubular center-post, through the ports 32 into the shell 35, and through the nipples 36 into the tubes 29.

Near the upper end of the tubular center-post 30 a collar 37 is secured thereon, said collar supporting a hub 38 which fits revolubly upon the upper terminal portion of the post. Said hub 38 is annularly chambered, the chamber 39 therein being in communication with ports 40 in the sides of the center-post so as to receive fuel-gas and air therefrom. The hub 38 has a plurality of radial arms 41 formed integrally therewith, the number of arms being one greater than the number of the ovens 17, or the same as the number of ovens would be if the annular space upon the base-rings were completely filled with the ovens. Near the outer end of each arm 41 there is a vertical standard 42 integral with the arm and having an upper terminal guide-arm 43 extending parallel with the outer end of the respective arm 41. In the vertically-spaced ends of the arms 41 and guide-arms 43 there are openings in which vertical rectangular bars 44 fit slidably, said bars 44 carrying at their lower ends marginally flanged rectangular horizontal plates 45 of which the longitudinal center-lines extend radially to the center-post 30. To said plates 45 are secrued the hollow conical male mold-members or cores 46, the upper portions of said cores being threaded and screwed into openings in the plates, and the cores being so spaced as to adapt them to fit concentrically within the mold-cavities 18 of the series of ovens. On the outer side of each of the vertical bars 44, between the arm 41 and the upper or guide-arm 43, there is carried a roller 47 which fits within a groove in the inner side of a stationary annular cam or track-ring 48, which is supported concentrically with the center-post by means of standards 49 extending from the ring down past the outer ends of the ovens and secured at their lower ends to the arms 12 of the base-frame. The track-ring 48 has upper and lower horizontal portions at the front and rear sides of the machine, and inclined ascending and descending portions connecting said horizontal portions, so that during rotation of the supporting spider, formed by the hub 38 and arms 41 thereon, the cores are held at one side of the machine in the elevated position shown at the left of Fig. 1, being lowered to the position shown at the right of said figure as they approach said side of the machine, and again raised to the elevated position as the movement is continued in a clockwise direction as viewed in Fig. 2. For heating the male mold-members or cores, there is secured above each of the plates 45 a pipe 50 having small pipes or burner-jets 51 extending downwardly therefrom into the conical central cavities of said cores, as shown in Fig. 6. Fuel-gas and air are supplied to the inner ends of the pipes 50 by means of flexible tubes 52 connected therewith and extending to nipples 53 connected with the lower side of the annular chamber 39 of the hub 38.

On the tubular post 30, at a position intermediate the collar 34 and the hub 11 of the base-frame, there is secured a collar 54, and upon said collar is supported the inner ends of two radially extending bars 55 and 56, the ends of said bars fitting pivotally about the post, and the outer portions thereof extending through a circumferential slot therefor in the base-rings 15 and 16 below the level of the flanges 15ᵃ and 16ᵃ. The outer portion of the bar 55 rests slidably upon a pedestal 57 carried by the base-frame plate 14, and said portion of the bar 55 is connected by means of a spring 58 with a lug 59 extending out from the side of the ring 16 as shown in Fig. 2. Slight pivotal movements of the bar 55 about the central axis of the machine are permitted, but such movement is yieldably limited by said spring 58. In the outer end of the bar 55 there is a bearing for the vertical drive-shaft 60, which is suitably connected with a source of power so as to be driven thereby at a uniform speed. On the upper end of said shaft 60 there is secured a crank-arm 61, and from the end of said crank-arm a laterally-curved connecting-rod 62 extends to and is pivotally connected with a pin 63 extending up vertically from the outer end of the bar 56. By rotation of the crank 61 the bar 56 is oscillated about the central axis of the machine, from a position such as that shown in Fig. 2 to a position nearly parallel with the bar 55. On the bar 56, adjacent to the inner and outer ends of the ovens, there are upwardly extending lugs 64 and 65, in the heads of which are carried pawls adapted to enter the notches 22 and 22ᵃ in the respective ends of the ovens. On the bar 55 there are similar lugs 66 and 67 carrying pawls adapted to enter the notches 21 and 21ᵃ of the ovens. In Fig. 2 the head of the lug 67 is shown in horizontal section, disclosing the pawl 68 which is pressed yieldingly toward the oven by a spring 69 arranged in the head at the end of the pawl, and it will be understood that the other pawls referred to are of similar arrangement. When the bar 56 is in the position shown in Fig. 2 the pawls carried thereby enter the notches 22 and 22ᵃ of the oven A, and movement of the bar first carries said oven across the space intervening between the same and the oven B, and after engaging the latter oven all of the ovens are pushed around the base-rings 15 and 16 until the oven A has reached the position originally occupied by the oven B, while the oven C rests in the position originally occupied by the oven A. At this position the pawls carried by the bar 55 enter the notches 21 and 21ᵃ of the oven A, retaining the same in position during the back-stroke of the swinging bar 56. During the oven-actuating movement the tension of the spring 58 is increased, the bar 55 moving slightly toward the bar 56, so that at the conclusion of the movement when the pawls of the bar 55 enter the notches of the oven A the latter is held firmly against the side of the next oven by the pull of the spring 58 transmitted to the oven through the bar 55 and the pawls carried thereby.

On the center-post 30, above the collar 33, there is mounted a sleeve 70 which is supported by said collar 33 and is movable pivotally about the post. On one side of said sleeve there is an upwardly extending lug 71 to which is pivoted the end of the ejector-bar 72. Near its pivoted end said bar has an enlarged portion with a central opening, adapting the same to pass around the center-post, and large enough to permit the bar to be raised to an inclined position such as is shown by dotted lines in Fig. 4. When the bar is in horizontal position it extends slightly above the upper surfaces of the ovens. On the lower side of the bar, intermediate its ends, there are carried a plurality of trunco-conical bodies or dummy cores 73, which are formed and spaced similarly to the male mold-members or cores 46, so that said dummy cores 73 are adapted to enter the mold-cavities in the same manner as the cores 46. At the outer end of the ejector-bar there is a roller 74 which fits movably in a slot extending lengthwise of an arcuate guide-bar 75. One end of said guide-bar is connected pivotally with the upper end of a standard 76 secured to and extending up from the pedestal 57, as shown in Figs. 1 and 2. From the other end of the guide-bar a connecting-rod 77 extends down to the horizontal arm of a bell-crank 78 which is fulcrumed on the base-frame as shown in Fig. 1. The short upwardly extending arm of the bell-crank is connected with a cam-rod 79 which extends therefrom to the shaft 60, the rod having a slotted head-portion which fits slidably about the shaft as indicated in Fig. 2, so that the rod is guided by the shaft but is movable radially thereof. The slotted head of the cam-rod rests upon a collar 80 secured to the shaft, and above the rod there is secured to the shaft a cam 81 having in the lower surface thereof a groove of the form indicated by dotted lines in Fig. 2. A roller 82 is carried by the cam-rod and fits in said cam-groove so that the rod is actuated thereby during rotation of the shaft 60, the movement imparted to the rod being such that during each revolution of the cam the guide-bar 75 and the outer end of the ejector-bar are held for a time in the horizontal position shown in Fig. 1, then raised so that the ejector-bar is in the position shown by dotted lines in Fig. 4, and finally lowered again to the horizontal position. Near the outer end of the ejector-bar a slotted link 83 is pivotally connected therewith and extends therefrom horizontally near the inner side of the guide-bar 75. The upper portion of the pin 63 carried at the outer end of the bar 56 passes loosely through the slot of said link 83, and during the swinging movements of the bar 56 about the center-post the ejector-bar is actuated by said pin 63 as follows: At the beginning of the movement from the position shown in Fig. 2 the pin 63 passes along the slot of the link 83, causing no movement of the ejector-bar until the pin reaches the end of the slot in the link. Thereafter and until the end of the stroke of the bar 56, the ejector-bar is moved coincidentally with the oven A, and the length of the slot in the link is so proportioned that at the end of the movement the ejector-bar is positioned above notches 151 and 161 formed in the flanges 15ᵃ and 16ᵃ of the base-rings, at the front side of the machine, as shown in Fig. 2. During the return stroke of the swinging bar 56, the ejector-bar first remains stationary while the pin 63 moves the length of the slot in the link 83, and is then carried back to the initial position, moving coincidentally with said swinging bar 56. The respective sets of actuating mechanism, for moving the ejector-bar pivotally about the central axis of the machine, and for raising and lowering the same, are so coordinated that the return stroke of the bar is made while the same is in the raised position, and the forward stroke made while the bar is in the lowered or horizontal position thereof. At one side of the ejector-bar, adjoining the dummy cores 73, there is a rod 84 of which the end-portions curve up around the side of the bar, said portions passing above the bar and the ends thereof being pivoted in lugs 85 on the upper side of the bar. The straight intermediate portion of said rod 84 tends by gravity to swing down against the sides of the dummy cores 73, but the rod may be swung from said position outwardly and upwardly about the axis of the pivoted ends thereof. On the outer curved end-portion of the rod 84 there is a pin 86 adapted for engagement with the inclined upper edge of a short track-piece 87 which forms the head of a T-shaped bar 88 secured to the base-ring 16 as shown in Fig. 3, and circumferentially positioned near the notch 161 as shown in Fig. 2. As the ejector-bar moves past said track-piece 87 the pin 86 engages the inclined upper edge thereof and the rod 84 is thereby swung out from the dummy cores 73 as indicated by the dotted lines in Fig. 3. It should be noted that the ejector-bar operates in that sector of the machine in which the male mold-members or cores 46 are raised out of the mold-cavities of the ovens, the ejector-bar passing between the ovens and said cores as will appear from Fig. 1.

During the operation of the machine the ovens are constantly heated by the combustion of gas and air supplied through the burner-tubes 28, and the cores 46 are constantly heated by flame-jets projected down into the central cavities thereof from the pipes 51. The batter or unbaked material is supplied in appropriate quantities, by any suitable means, to the pockets or mold-cavities formed between the successive pairs of the ovens when the same are in the positions of the ovens B and D, shown in Fig. 2. After the introduction of the batter into the mold-cavities, the molds are closed by the lowering of the cores 46 into the cavities, said movement being controlled by the track-ring 48. Said track-ring is so arranged that the greater part of the closing movement is made while the ovens are passing from the filling position to the next succeeding position, or to the position of the molds between the ovens D and E in Fig. 2. The track-ring is so inclined that from the last-mentioned position the closing of the molds proceeds very gradually, the closure being completed at the fourth or fifth succeeding position beyond the filling position. This gradual closure of the molds after the initial closing movement, by permitting the upper part of the mold to remain partially open during approximately one-half of the baking period, enables the free escape from the mold of steam and moisture expelled from the batter, most of which occurs during the first part of the baking period. The rate of operation of the machine is so proportioned to the heat of the ovens that the cones will be properly baked when the ovens have made about three-fourths of the circuit around the base-rings from the filling position. On approaching this point the cores 46 are raised out of the mold-cavities by the ascending portion of the track-ring 48, the baked cones being retained in the mold-cavities by the engagement of portions of the cones in annular grooves 89 formed in the mold-cavities as shown clearly in Fig. 6.

It may be here noted that each of the plates 45 which carry the cores 46 are provided on the lower side thereof with one or more pins 90 adapted to enter corresponding openings 91 in the upper sides of the ovens as said plates are lowered into proximity to the ovens. Said pins serve to correctly center the several cores in the respective mold-cavities, and also form a driving connection between the ovens and the spider consisting of the hub 38 and arms 41, since some of the plates 45 are always in lowered position with the pins 90 thereon engaged with the ovens.

As each pair of the ovens reaches the position of the ovens A and C in Fig. 2, the corresponding cores 46 reach the fully-raised position thereof shown at the left of Fig. 1, and the dummy cores 73 carried by the ejector-bar are lowered into the baked cones contained in the mold-cavities between the respective pair of ovens. As the ejector-bar is lowered the retaining-rod 84 strikes the top of the oven A and is held up thereby until said oven has been moved partly across the gap or space between the same and the oven B, after which said rod 84 drops down against the sides of the cones so as to retain them temporarily upon the dummy cores. The dummy cores serve to hold the cones stationary while the oven A is moved away from them, and thus strips the cones out of the recesses in said oven. When the pin 63 engages the end of the slot in the link 83, during the movement of the oven A toward the oven B, the ejector-bar is swung away from the oven C and the cones are thereby stripped from the recesses in the side of said oven, the cones being thus freed except for being held upon the dummy cores 73 by the retaining-rod 84. Finally, as the ejector-bar reaches a position above the notches 151 and 161, the retaining-rod is lifted by the engagement of the pin 86 with the track-piece 87, and the cones are permitted to drop through the notches 151 and 161 and the space between them, into any suitable receptacle therefor disposed beneath the machine.

Referring now to Figs. 5 and 7 in particular, there are shown in said figures, certain preferred details of constuction of the mold-parts which contribute materially to the production of baked cones having a clean and strong upper edge portion, such that the same have a pleasing appearance and are not liable to breakage in shipping and packing. At the upper end each of the mold-cavities 18 has therein an annular groove 92, similar to the grooves 89 before referred to, said groove 92 being adapted to shape the lower and outer side of a bead or thickened reinforcing part at the upper end of the cones baked in the mold. The remainder of said bead or projecting part of the cone is shaped within a concave channel 93 formed in the lower side of a flange 94 which extends around the upper portion of the core or male mold-member 46. The lower outer edge of said flange 94 presents a sharp cutting edge which is circular and slightly larger in diameter than the adjacent margin of the mold-cavity at the upper edge of the groove 92. When the mold is fully closed said sharp edge of the flange 94 rests upon the upper surface of the ovens in which the mold-cavity is formed, and serves to separate or cut off from the body of the baked cone any surplus or excess material that may have been expressed from the mold-cavity during the lowering of the core thereinto. To insure the complete closure of the mold and the consequent cutting off of the fin or ring of excess material, in the event of slight distortions or warping of the mold-parts when heated, there is provided in connection with the flange 94 a trimmer-ring 95. The trimmer-ring is L-shaped in cross-section, having a horizontal flange extending above the flange 94 of the core, and a vertical flange fitting slidably upon the outer or peripheral edge of the flange 94. The lower outer port of the said vertical flange is beveled to a sharp edge which normally extends slightly below the adjoining sharp edge of the flange 94, the trimmer-ring being pressed yieldingly downward by an undulatory spring-washer 96 disposed between the plate 45 and the horizontal flange of the trimmer-ring, as shown clearly in Fig. 7 in which the core 46 is omitted. It will be seen that, by the separation of the excess material from the body of the cone, effected by the sharp lower edges of the trimmer-ring and flange 94, the cones will be detached from the excess material when ejected from the machine, and clean perfect cones may be produced without the use of other trimming means therefor. The bead or thickened upper edge portion, formed on the cones by means of the groove 92 and channel 93, makes the cones less liable to breakage than if the upper edges thereof were the same thickness as the main body, and also gives the cones a more finished and sightly appearance.

It may be noted that the spring 58, by permitting slight variations in the position of the bar 55, enables the latter to compensate for thermal expansion and contraction of the ovens and insures the proper engagement with the ovens of the pawls carried by said bar 55. It may be noted further that by the use of the locking-plates 24 the several ovens are securely connected to each other in a contacting series during that portion of their circuit of movement in which the cones are being baked therein.

Now, having described my invention, what I claim and desire to secure by Letters Patent is:

1. In a machine of the class described, a plurality of movable mold members each recessed in its opposite sides and so mounted as to register in successive pairs to form mold-cavities, means for retaining said mold-members in a juxtaposed series having a gap between the ends thereof substantially equal to the width of one of the members, and means for transposing the members singly across the gap from one end to the other end of the series.

2. In a machine of the class described, an endless support, a plurality of ovens arranged upon said support and having opposite side-faces contacting serially and recessed to form mold-cavities between them, the contacting series of ovens having a gap between the ends thereof substantially equal to the width of one of the ovens, and means for transposing single ovens across said gap to open the mold-cavities at one side of the respectively-moved ovens and close the mold-cavities at the opposite side thereof.

3. In a machine of the class described, an endless support, ovens arranged serially upon said support and having mold-cavities formed in the adjacent side-faces thereof, the ovens at the two ends of the series being spaced from and not connected to each other, and means for transposing single ovens across the space from one end to the other end of the series and to thereby open the mold-cavities at one side and close the mold-cavities at the other side of the respectively transposed ovens.

4. In a pastry cone making machine, a circular support, a plurality of ovens arranged thereon in contacting series, the contacting sides of the ovens being recessed to form mold-cavities openable by separation of the respective pairs of ovens, and means for transferring single ovens across a gap between the ends of the contacting series thereof, said means also adapted to move the entire contacting series of ovens subsequently to the transfer of the single ovens across the gap.

5. In a pastry cone making machine, a circular support, a contacting series of ovens movable about said support, the end ovens of the series being spaced but adjacent to each other, means for transferring said ovens successively from one end to the other end of the series and for moving the entire series about the support, the adjoining sides of the ovens being recessed to form mold-cavities between them, said mold-cavities being open at their upper ends, cores movable vertically into and out of said mold-cavities, and means for actuating said cores.

6. In a pastry-cone baking machine, a circular stationary support, ovens movable upon said support concentrically therewith and having recessed sides forming mold-cavities in juxtaposed pairs thereof, male mold-members adapted to enter said mold-cavities, means for actuating the ovens about the support, carrying means for said male mold-members movable concentrically with said support and having means interengageable with parts of the ovens so as to be actuated therefrom, a stationary track-ring controlling movement of said male mold-members into and out of the mold-cavities, dummy cores, a support therefor movable concentically with the oven-support in the space between the ovens and the male mold-members when the latter are withdrawn from the mold-cavities, and means for actuating the latter support to insert said dummy cores in the mold-cavities of the successively adjacent ovens.

7. In a pastry cone baking machine, a circular support, a plurality of sector-shaped ovens mounted thereon and having in their radial sides mating recesses forming mold-cavities, the number of ovens being less than enough to fill the space upon the support, means for securing the ovens together in a contacting series, means for serially transposing the ovens from one end of the series to the other and subsequently moving all of the ovens simultaneously to advanced positions on the support, male mold-members adapted to enter the mold-cavities and to move with the ovens during the simultaneous advances thereof, means for moving said male mold-members out of the mold-cavities at the transposing position, ejecting means for stripping the baked product from the mold-cavities at the transposing position, and means for heating the ovens and male mold-members.

8. In a pastry-cone baking machine, a separable mold having therein a conical mold-cavity of which the larger end opens to a flat outer face of the mold-member, a conical core entering said end of the mold-cavity and spaced therefrom, an annular flange having a cylindrical outer face and extending laterally from said core beyond the margin of the mold-cavity, an annular member fitting slidably upon said cylindrical outer face of said flange and having a continuous cutting-edge adjoining said face, and means yieldably pressing said annular member toward the mold-member to engage said cutting-edge with said flat outer face of the mold-member.

9. In a machine of the class described, a support, a plurality of female mold members arranged upon said support and having opposite side faces contacting serially and recessed to form mold cavities between them, the contacting series of mold members having a gap between the ends thereof, means for transposing single mold members across said gap to open the mold cavities at one side of the respectively-moved mold members and close the mold cavities at the opposite sides thereof, cores cooperating with the mold cavities, means for raising and lowering said cores at intervals to remove them from and introduce them to the mold cavities, and means for applying heat to the mold members and cores.

10. In a pastry cone baking machine, the combination of a separable two-part female mold-member, a male mold-member positioned within said female mold-member, means for heating said male and female mold-members to bake material in the mold-cavity between them, means for moving the male mold-member out of the mold-cavity while the baked product remains in the female mold-members, a dummy core movable into the mold-cavity, means for moving the female mold-members laterally relative to the dummy core, means for holding said dummy core against axial movement during the opening movement of the female mold-members, means for retaining the baked product on the dummy core after the same has been detached from the female mold-members, and means for operating the retaining means to release the baked product from the dummy core.

11. In a machine of the class described, a support, a plurality of female mold members arranged upon said support and having opposite side faces contacting serially and recessed to form mold cavities between them, the contacting series of mold members having a gap between the ends thereof, means for transposing single mold members across said gap to open the mold cavities at one side of the respectively-moved mold members and close the mold cavities at the opposite side thereof, cores cooperating with the mold cavities, means for raising and lowering said cores at intervals to remove them from and introduce them to the mold cavities, means for applying heat to the mold members and cores, and means for detaching the baked product from the mold cavities.

12. In a machine of the class described, a support, a plurality of female mold members arranged upon said support and having opposite side faces contacting serially and recessed to form mold cavities between them, the contacting series of mold members having a gap between the ends thereof, means for transposing single mold members across said gap to open the mold cavities at one side of the respectively-moved mold members and close the mold cavities at the opposite side thereof, cores cooperating with the mold cavities, means for raising and lowering said cores at intervals to remove them from and introduce them to the mold cavities, means for applying heat to the mold members and cores, dummy cores, and means for introducing said dummy cores into the mold cavities on removal of the molding cores and manipulating said dummy cores to detach the baked product from the mold cavities.

13. In a machine of the class described, wherein is provided a plurality of sets of separable molds and cores therefor with means for heating the same and means for opening and closing the molds and introducing and removing the mold cores from the mold cavities; a set of dummy cores, means for introducing said dummy cores into the cavities of the baked articles on removal of the mold cores, means for holding the dummy cores against movement in the direction of their axes while the molds are being opened to extract the article, and means for moving the dummy cores laterally after the molds have begun to open to cause said dummy cores to detach the articles from the molds.

14. In a machine of the class described, wherein is provided a plurality of sets of separable molds and cores therefor with means for heating the same and means for opening and closing the molds and introducing and removing the cores from the mold cavities; a set of dummy cores, means for introducing said dummy cores into the cavities of the baked articles on removal of the mold cores, means for holding the dummy cores against withdrawal movement in the direction of their axes while the molds are being opened to extract the articles, and means for moving the dummy cores laterally after the molds have begun to open to cause said dummy cores to detach the articles from the molds.

15. In a machine of the class described, separable members having semi-mold cavities, the mold cavity being formed by bringing into registry the semi-mold cavities in the adjacent separable members, cores movable into and out of said cavities, means for heating the molds and cores, dummy cores, means for inserting said dummy cores into the cavities of the baked article upon removal of the molding cores, means for moving one mold-member away from the other mold-member and away from the dummy core to detach the article from said one mold-member, and means for moving the dummy core away from the other mold-member to detach the article from the same.

16. In a machine of the class described, separable mold members having semi-mold-cavities, the mold cavity being formed by bringing into registry the semi-mold cavities in the adjacent separable members, cores movable into and out of said cavities, means for heating the molds and cores, dummy cores, means for inserting said dummy cores into the cavities of the baked article upon removal of the molding cores, means for moving one mold member laterally away from the other mold member and from the dummy core to detach the article from said one mold member, and means for moving the dummy core laterally away from the other mold member to detach the article from the same.

17. In a machine of the class described, wherein is provided a plurality of sets of separable molds and cores therefor, with means for heating the cores and molds, means for withdrawing the cores from the molds, a set of dummy cores, means for introducing the dummy cores into the cavities of the baked articles after removal of the mold cores, and means for effecting relative movement between the mold sections and the dummy cores in a plane at right angles to the direction of the axis of the mold cavities.

18. In a machine of the class described wherein is provided a plurality of sets of separable female molds and cores therefor, means for opening said female molds by holding one section stationary and moving the other section away from the stationary section; means for withdrawing the cores, a set of dummy cores adapted to be inserted into the cavities of the baked articles on removal of the mold cores, means for holding the dummy core against lateral movement while one section of the female mold separates from the other and then moving the dummy core laterally away from the said other section to thereby detach the baked articles from the mold cavity walls and means for applying heat to the molds and cores.

19. In a machine of the class described, a plurality of sets of separable mold sections having semi-mold cavities, those of one section adapted to register with those of the opposing section, cores therefor, means for heating the molds, means for sustaining the mold sections to be opened and closed by relative movement of the same bodily, laterally, while maintaining their opposing faces in planes parallel to the axis of the mold cavities as a whole, means for relatively moving the mold sections to effect the opening and closing thereof by moving one mold section away from the other mold section while holding said other mold section immovable, means for introducing and removing the cores from the mold cavities, a set of dummy cores, means for introducing said dummy cores into the cavities of the baked article after removal of the mold cores, means holding said dummy cores in the article cavities during the commencement of the relative mold-section opening movement, whereby the articles may be loosened from the moving mold section and for subsequently causing the dummy cores to loosen the article from the remaining mold section.

20. In a cone making machine, an endless support, ovens movable upon said support step by step and each having recessed sides forming mold cavities in juxtaposed pairs thereof, male mold members adapted to enter said mold cavities, means for moving said mold members along the support to separate a member of a pair and move it against an adjacent member in advance, to thereby open one set of mold cavities and close another set, carrying means for said male mold members, means for moving said carrying means cooperatively with said mold members, means for raising and lowering said carrying means to remove and introduce the male mold members from and to the mold cavities, means for applying heat to said ovens and male mold members to bake the contents of the ovens, and means for supplying batter to the ovens.

21. In a cone making machine, an endless support, ovens movable upon said support step by step and each having recessed sides forming mold cavities in juxtaposed pairs thereof, male mold members adapted to enter said mold cavities, means for moving said mold members along the support to separate a member of a pair and move it against an adjacent member in advance, to thereby open one set of mold cavities and close another set, carrying means for said male mold members, means for moving said carrying means cooperative with said mold members, means for raising and lowering said carrying means to remove and introduce the male mold members from and to the mold cavities, means for applying heat to said ovens and male mold members to bake the contents of the ovens, means for supplying batter to the ovens, and means distinct from the male mold members for detaching the baked product from the oven.

22. A cone making machine of the class described, having a plurality of separable female molds and cores therefor in which the cones are baked, means for moving the molds and cores together during the baking operation, means for moving the core axially to detach it from the interior of the baked cone, means for opening the female molds by moving one mold section away from the other mold section thereby to detach the one mold section from the cone, and means for moving the cone laterally to detach it from the other mold section.

23. In a machine of the class described wherein is provided a plurality of sets of separable female molds and cores therefor, means for moving the molds and cores together during the baking operation, means for opening the female molds by holding one section stationary and moving the other section away from the stationary section, thereby to detach the mold section from the cone while retaining the cone against the other mold section, and means for moving the cone laterally away from the stationary mold section to detach it therefrom.

ROY G. KRATZ.